US012753737B2

(12) United States Patent
Couchman et al.

(10) Patent No.: US 12,753,737 B2
(45) Date of Patent: Oct. 6, 2026

(54) SYSTEM AND METHOD FOR CONTROLLING A WIND TURBINE DURING A COMMUNICATION LOSS

(71) Applicant: GE Infrastructure Technology LLC, Greenville, SC (US)

(72) Inventors: Ian Couchman, Horley (GB); Zachary Kurt Blaettler, Greenville, SC (US); Matthew Beeson, Nailstone (GB); Till Hoffmann, Osnabrueck (DE); Conner Brooks Shane, Glenville, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/065,044

(22) Filed: Feb. 27, 2025

(65) Prior Publication Data

US 2026/0251120 A1 Aug. 27, 2026

(51) Int. Cl.
*F03D 7/02* (2006.01)

(52) U.S. Cl.
CPC ...... *F03D 7/0224* (2013.01); *F05B 2270/107* (2013.01); *F05B 2270/328* (2013.01)

(58) Field of Classification Search
CPC .............. F03D 7/0224; F05B 2270/107; F05B 2270/328; F05B 2270/1074
See application file for complete search history.

(56) References Cited

U.S. PATENT DOCUMENTS

| | | | |
|---|---|---|---|
| 7,962,246 | B2 | 6/2011 | Middendorf |
| 8,116,914 | B2 | 2/2012 | Oohara |
| 8,430,632 | B2 | 4/2013 | Haag |
| 8,928,165 | B2 | 1/2015 | Vasak |
| 9,528,494 | B2 | 12/2016 | Gao |
| 9,926,910 | B2 | 3/2018 | Chacon |
| 10,267,291 | B2 | 4/2019 | Hammerum |

(Continued)

FOREIGN PATENT DOCUMENTS

| | | | |
|---|---|---|---|
| CN | 108443065 | A | 8/2018 |
| CN | 110296046 | A | 10/2019 |

(Continued)

*Primary Examiner* — Nathaniel E Wiehe
*Assistant Examiner* — Theodore C Ribadeneyra
(74) *Attorney, Agent, or Firm* — Dority & Manning, P.A.

(57) ABSTRACT

A method for controlling a wind turbine having a plurality of rotor blades. The method includes receiving, via a control module arranged in a hub of the wind turbine and in communication with a pitch controller of the wind turbine, first data associated with operation of the wind turbine. The method also includes detecting, via the control module, a communication loss between the control module and a turbine controller arranged external to the hub. Further, the method includes determining, via the control module, a plurality of pitch trajectories for the plurality of rotor blades based, at least in part, on the first data received from the plurality of sensors arranged in the hub. In addition, the method includes, in response to a duration of the communication loss between the control module and the turbine controller exceeding a ride-through time, controlling, via the control module, a plurality of pitch adjustment mechanisms of the plurality of rotor blades independently based on the plurality of pitch trajectories.

20 Claims, 4 Drawing Sheets

(56) References Cited

U.S. PATENT DOCUMENTS

| | | | | |
|---|---|---|---|---|
| 10,539,119 | B2 | 1/2020 | Dua et al. | |
| 11,401,917 | B2 | 8/2022 | Garcia et al. | |
| 11,939,959 | B2 | 3/2024 | Hammerum et al. | |
| 2009/0243295 | A1 * | 10/2009 | Kammer | F03D 7/043<br>290/44 |
| 2010/0133815 | A1 * | 6/2010 | Middendorf | F03D 7/0224<br>290/44 |
| 2011/0040413 | A1 | 2/2011 | Jeppesen et al. | |
| 2012/0093645 | A1 * | 4/2012 | Haag | F03D 7/0224<br>416/34 |
| 2016/0258416 | A1 | 9/2016 | Hammerum | |
| 2022/0403821 | A1 | 12/2022 | Hammerum et al. | |
| 2022/0403822 | A1 | 12/2022 | Hammerum et al. | |

FOREIGN PATENT DOCUMENTS

| | | | |
|---|---|---|---|
| EP | 2535574 | A1 | 12/2012 |
| KR | 20130074261 | A | 7/2013 |
| KR | 101466104 | B1 | 11/2014 |
| KR | 101475274 | B1 | 12/2014 |
| WO | WO2015/003710 | A1 | 1/2015 |
| WO | WO2021/098925 | A1 | 5/2021 |

* cited by examiner

SYSTEM AND METHOD FOR CONTROLLING A WIND TURBINE DURING A COMMUNICATION LOSS

FIELD

The present disclosure relates in general to wind turbines, and more particularly to systems and methods for controlling a wind turbine during a communication loss.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain within the nacelle. The drivetrain typically includes various drivetrain components, such as a generator and a gearbox. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

During operation of a wind turbine, each rotor blade is subject to deflection and/or twisting due to the aerodynamic wind loads acting on the blade, which results in reaction loads transmitted through the blade. To control these loads and allow for maximum loading of the rotor blades to capture a maximum amount of wind energy without overloading and potentially damaging the rotor blades and other wind turbine components, the rotor blades may be pitched during operation. Pitching of the rotor blades involves adjusting, such as rotating, a respective rotor blade about a pitch axis. As such, pitching of the rotor blade adjusts the loading that the rotor blade is subjected to during operation.

In many cases, each rotor blade is pitched to an individual pitch angle, which may be different from the pitch angles of other rotor blades in the wind turbine. Further, these angles may be constantly or intermittently adjusted during operation. Such pitching operation for the rotor blades beneficially allows for frequent adjustment of the loading experienced by the rotor blades.

However, in some conditions, such as a power failure or communication breakdown, communication may be lost between a turbine controller of the wind turbine, which may control pitching of the rotor blades, and one or more individual pitch controllers. Typically, in such conditions, the pitch controllers can control the pitch of the rotor blades to ride-through the communication loss for a limited amount of time (e.g., 1-1.5 seconds) based on a reference pitch angle determined just prior to the communication loss. After the limited amount of time, the reference pitch angle may no longer be a good proxy for a pitching torque. As such, the wind turbine may be shut down. In such situations, the pitch controllers may control pitch adjustment mechanisms to follow a pitching profile to pitch to a feathered position. However, the rotor blades may not be pitched at the same pitch angle when initiating the pitch profile, which can create imbalanced loading of the rotor blades while pitching to the feathered position.

As such, the present disclosure is directed to systems and methods that, after a ride through time associated with a communication loss between a controller arranged in a hub and a turbine controller, control a plurality of pitch adjustment mechanisms independently based on data collected via sensors arranged in the hub. Independently controlling the plurality of pitch adjustment mechanisms in this manner can prevent imbalance between rotor blades while shutting down the wind turbine after the ride-through time.

BRIEF DESCRIPTION

Aspects and advantages of the present disclosure will be set forth in part in the following description, or may be obvious from the description, or may be learned through practice of the present disclosure.

In an aspect, the present disclosure is directed to a method for controlling a wind turbine having a plurality of rotor blades. The method includes receiving, via a control module arranged in a hub of the wind turbine and in communication with a pitch controller of the wind turbine, first data associated with operation of the wind turbine. The first data is collected via a plurality of sensors arranged in the hub and in communication with the control module. The method also includes detecting, via the control module, a communication loss between the control module and a turbine controller arranged external to the hub. Further, the method includes determining, via the control module, a plurality of pitch trajectories for the plurality of rotor blades based, at least in part, on the first data received from the plurality of sensors arranged in the hub. The plurality of pitch trajectories configured to prevent imbalance of the plurality of rotor blades. In addition, the method includes, in response to a duration of the communication loss between the control module and the turbine controller exceeding a ride-through time, controlling, via the control module, a plurality of pitch adjustment mechanisms of the plurality of rotor blades independently based on the plurality of pitch trajectories.

In another aspect, the present disclosure is directed to a system for controlling a wind turbine. The system includes a hub and a plurality of rotor blades coupled to the hub and including a plurality of pitch adjustment mechanisms. The system also includes a control module arranged in the hub and in communication with a pitch controller of the wind turbine. The control module including at least one processor configured to perform a plurality of operations. The plurality of operations include receiving first data associated with operation of the wind turbine. The first data is collected via a plurality of sensors arranged in the hub and in communication with the control module. The plurality of operations also include detecting a communication loss between the control module and a turbine controller arranged external to the hub. Further, the plurality of operations determining a plurality of pitch trajectories for the plurality of rotor blades based, at least in part, on the first data received from the plurality of sensors arranged in the hub. The plurality of pitch trajectories configured to prevent imbalance of the plurality of rotor blades. In addition, the plurality of operations include, in response to a duration of the communication loss between the control module and the turbine controller exceeding a ride-through time, controlling, via the control module, a plurality of pitch adjustment mechanisms of the plurality of rotor blades independently based on the plurality of pitch trajectories.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
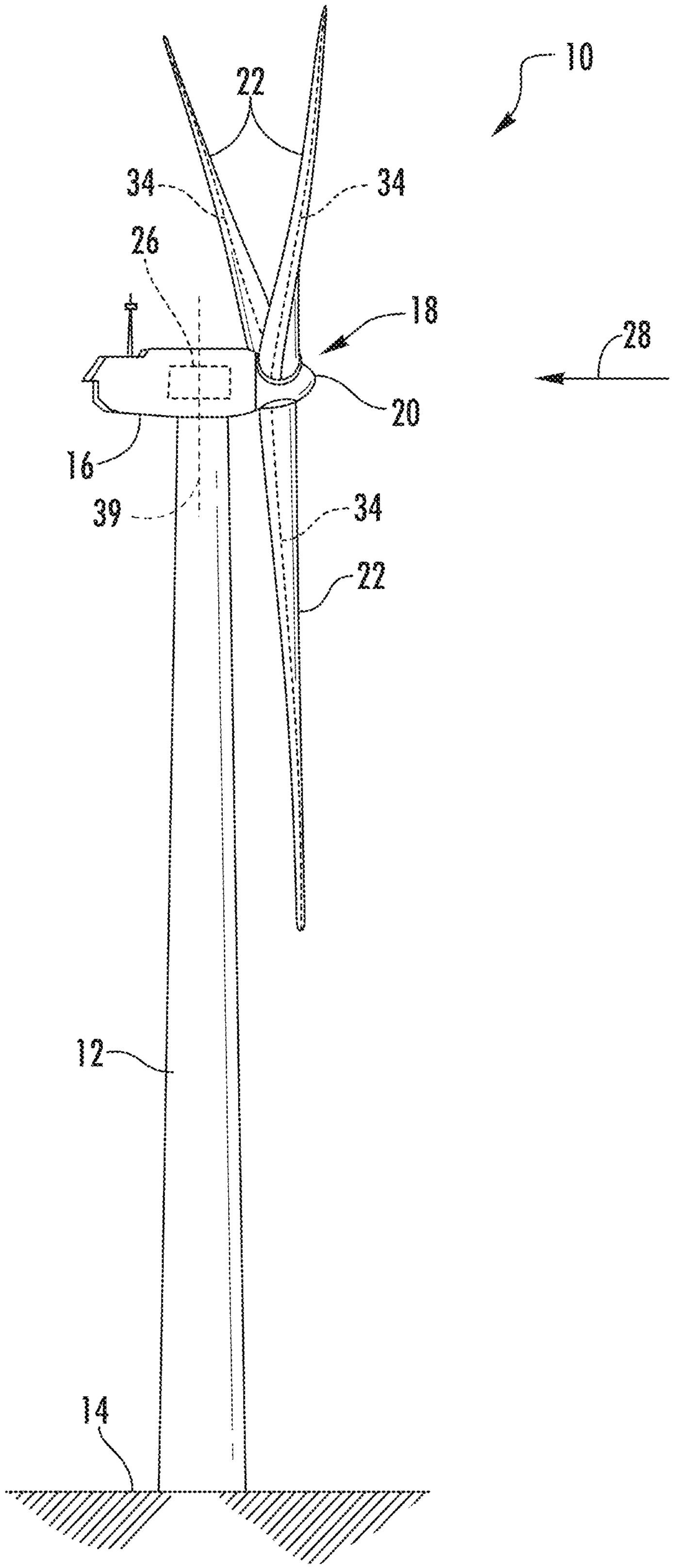
FIG. 1 illustrates a perspective view of a wind turbine according to an embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Generally, the present disclosure is directed to systems and methods for controlling a wind turbine having a plurality of rotor blades. During operation of the wind turbine, each rotor blade may be individually pitched so as to control loading on the rotor blades as well as to achieve desired operation of the wind turbine. However, communication can be lost between a turbine controller, which generates commands for pitching the rotor blades, and one or more pitch controllers, which control the pitching based on the commands. When communication is lost for longer than ride through capabilities of the wind turbine, the wind turbine may be shut down. During the shutdown, the rotor blades may be subjected to imbalanced loading due to differences in the individual pitch angles. As such, sensors can be arranged in the hub of a wind turbine and can be in communication with one or more control modules arranged in the hub. The control module(s) can use data obtained from the sensors arranged in the hub to determine respective pitch trajectories for the individual rotor blades. Accordingly, systems and methods of the present disclosure are configured to determine the respective pitch trajectories for the individual rotor blades based on data obtained from the sensors arranged in the hub so as to prevent loading imbalance during the shutdown.

Referring now to the drawings, FIG. 1 illustrates a perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
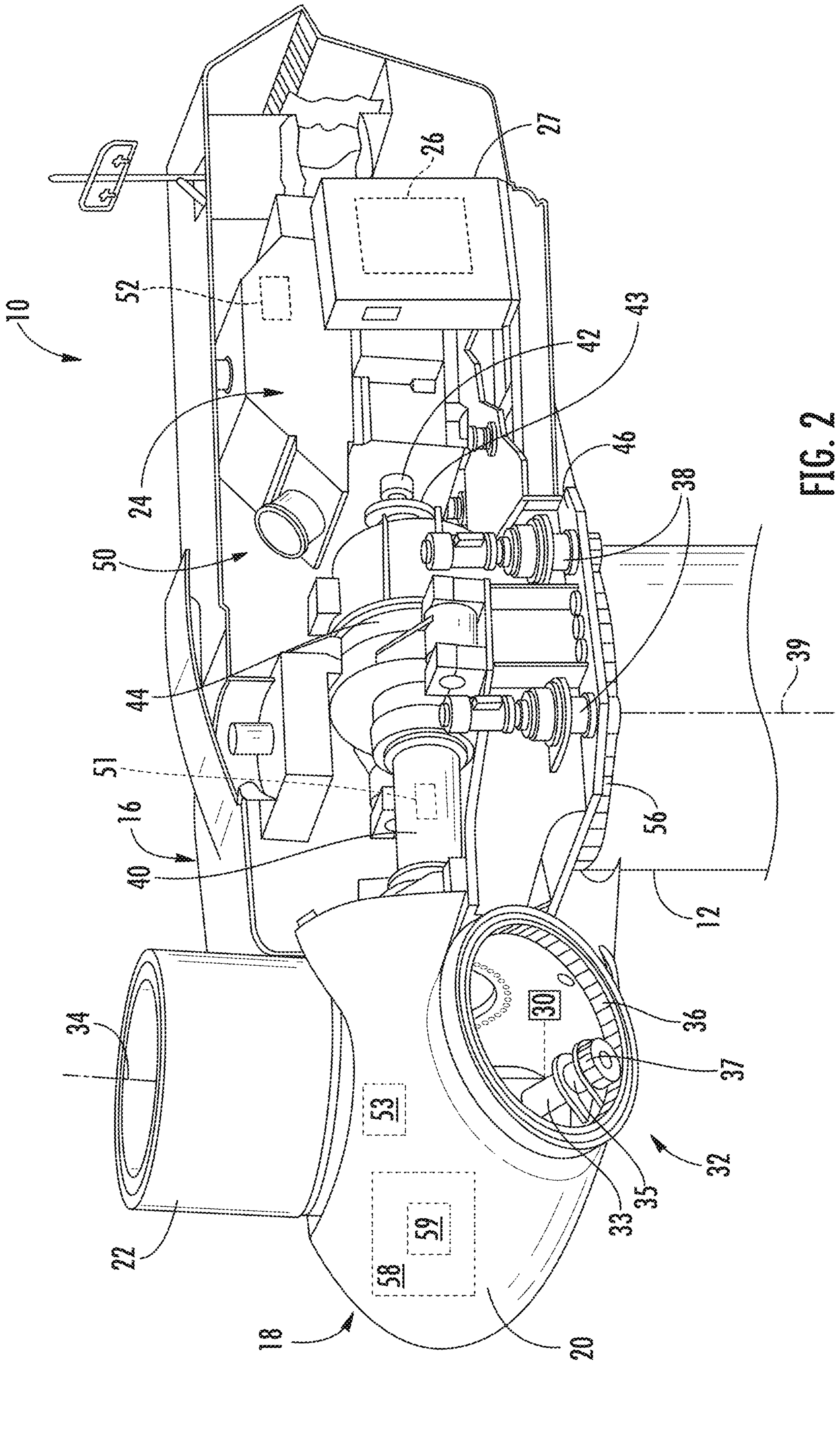
FIG. 2 illustrates a perspective, internal view of a nacelle of a wind turbine according to an embodiment of the present disclosure.

Referring now to FIG. 2, a simplified, internal view of an embodiment of the nacelle 16 of the wind turbine 10 is illustrated. As shown, the wind turbine 10 includes the generator 24 disposed within the nacelle 16. In general, the generator 24 may be coupled to the rotor 18 of the wind turbine 10 for generating electrical power from the rotational energy generated by the rotor 18. For example, the rotor 18 may include a rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. As is generally understood, the rotor shaft 40 may provide a low speed, high torque input to the gearbox 44 in response to rotation of the rotor blades 22 and the hub 20. The gearbox 44 may then be configured to convert the low speed, high torque input to a high speed, low torque output to drive the generator shaft 42 and, thus, the generator 24. However, in other embodiments, it should be appreciated that the generator shaft 42 may be rotatably coupled directly to the rotor shaft 40. Alternatively, the generator 24 may be directly rotatably coupled to the rotor shaft 40. Such components may be generally referred to herein as a drivetrain 50 or drivetrain assembly.

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 27 mounted to a portion of the nacelle 16. However, it should be appreciated that the turbine controller 26 may be disposed at any location on or in the wind turbine 10, at any location on the support surface 14 (FIG. 1) or generally at any other location. The turbine controller 26 may generally be configured to control the various operating modes (e.g., start-up or shut-down sequences) and/or components of the wind turbine 10.

As shown in FIG. 2, the wind turbine 10 may further include at least one pitch adjustment mechanism 32 for each of the rotor blades 22 that is configured to rotate each rotor blade 22 about its pitch axis 34. In an embodiment, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 36 coupled between the hub 20 and a corresponding rotor blade 22 such that rotation of the pitch drive pinion 37 causes rotation of the pitch bearing 36. Thus, in such embodiments, rotation of the pitch drive motor 33 drives the pitch drive gearbox 35 and the pitch drive pinion 37, thereby rotating the pitch bearing 36 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10 and rotating the nacelle 16 about a yaw axis 39).

Further, as shown, the wind turbine 10 may include one or more pitch controllers 30 (FIG. 2) for controlling and/or altering the pitch angle of each respective rotor blade 22 (i.e., an angle that determines a perspective of the rotor blades 22 with respect to a direction 28 of the wind). For example, the pitch controller(s) 30 are communicatively coupled with the pitch adjustment mechanisms 32. As such, the pitch adjustment mechanisms 32 may be configured to rotate each respective rotor blade 22 about its pitch axis 34 based on commands received from the pitch controller(s) 30. In some embodiments, the pitch controller(s) 30 receives the commands from a downstream controller. In other embodiments, the pitch controller(s) 30 can generate the commands. Further, in an embodiment, the pitch controller(s) 30 is positioned within the hub 20, as shown.

As discussed, the pitch adjustment mechanism 32 may thus be configured to pitch the rotor blade 22 to a pitch angle. Such pitching may occur constantly or intermittently during operation of the wind turbine 10. The pitch angle of the rotor blade 22 may be determined relative to a fine position and/or a feathered position for the rotor blade 22. The fine position may be a position of maximum aerodynamic torque for the rotor blade 22. Thus, in the fine position, maximum loading of the rotor blade 22 may occur during operation of the wind turbine 10. The feathered position may be a position of minimum or zero aerodynamic torque for the rotor blade 22. Thus, in the feathered position, minimum or zero loading of the rotor blade 22 may occur during operation of the wind turbine 10.

Furthermore, in some embodiments, the wind turbine 10 may also include a hub controller 58 disposed within the hub 20, as shown in FIG. 2. In such embodiments, the hub controller 58 may be communicatively coupled to the pitch controller(s) 30 (e.g., via Ethernet Local Area Network (LAN), wireless LAN, a Controller Area Network (CAN) bus, fiber optic connection, or any other communication connection that enables operations as described herein). That is, in an embodiment, the hub controller 58 is a separate controller apart from the pitch controller(s) 30. As such, the hub controller 58 may be configured to transmit commands to the pitch controller(s) 30 for controlling the pitch adjustment mechanisms 32. Further, in an embodiment, the hub controller 58 may be downstream of the pitch controller(s) 30. In such embodiments, the turbine controller 26 may be downstream of the hub controller 58 and the pitch controller (s) 30. It should be understood that, as used herein, the terms "downstream" refers to the relative positioning of components with respect to an incoming wind direction.

The hub controller 58 and/or the pitch controller(s) 30 may also be communicatively coupled to the turbine controller 26, e.g., via a slip ring 43 configured to transmit commands via a serial communication protocol or another suitable communication protocol, such as broadband over power line (BPL) protocol. Further, the wind turbine 10 includes one or more control module(s) 59 configured generally to control the pitch adjustment mechanisms 32 during a communication loss between the turbine controller 26 and the hub controller 58 (or between the turbine controller 26 and the pitch controller(s) 30). For example, contamination, wear, misalignment, and/or other factors may hinder proper electrical contact of the slip ring 43 and thereby cause the communication loss. In response to the communication loss, the control module(s) 59, as described below, can control the pitch adjustment mechanisms 32 to achieve desired conditions, such as, but not limited to, a rotational speed of each rotor blade 22, a load acting on each rotor blade 22, a pitch angle of each rotor blade 22, etc. In an embodiment, the control module(s) 59 may be programmed in one or more of the pitch controllers 30 or the hub controller 58 arranged in the hub 20.

Moreover, the slip ring 43 may be configured to transform the commands generated by the turbine controller 26 from a fixed reference frame (e.g., a three-phase coordinate system, such as an abc coordinate system) to a rotating reference frame (e.g., a two phase coordinate system, such as a d-q coordinate system). For example, in embodiments, the turbine controller 26 may be configured to generate commands specified relative to the fixed reference frame, and the control module(s) 59 may be configured to execute commands specified relative to the rotating reference frame. As such, the slip ring 43 may be configured so as to permit control module(s) 59 to control the pitch adjustment mechanisms 32 based on commands generated by the turbine controller 26. In some embodiments, the wind turbine 10 may lack the hub controller 58.

In addition, as shown in FIG. 2, one or more sensors 51, 52, 53 may be provided on the wind turbine 10. As shown, some of the sensors 51, 52 may be arranged in the nacelle 14 (i.e., external to the hub 20). For example, a shaft sensor 51 may be communicatively coupled with the rotor shaft 40 and/or the rotor 18 to monitor operating parameters thereof, such as the speed and/or the torque. As another example, a generator sensor 52 may be communicatively coupled with the generator 24 to monitor operating parameters thereof, such as the speed and/or the torque. The sensors 51, 52 may further be in communication with the turbine controller 26 and may provide related information to the turbine controller 26. Further embodiments may include any other suitable type of sensor, such as wind vanes, accelerometers, or similar.

Moreover, as shown, at least one sensor 53 may be arranged on or within the hub 16 and/or on or within the rotor blades 22. For example, the sensor 53 may include one or more rate gyroscopes (also known as a rate gyro) mounted in the hub 16. As used herein, a rate gyro generally refers to a type of gyroscope that indicates the rate of change of an angle with respect to time. If a gyro has only one gimbal ring, with consequently only one plane of freedom, it can be adapted for use as a rate gyro to measure a rate of angular movement. In addition, the rate gyros described herein may also encompass micro-electro-mechanical system (MEMS) gyroscopes. Additionally, or alternatively, the sensor 53 may be configured to monitor one or more operating parameters of the rotor blades 22, such as the rotational speed of and/or loads induced to each blade 22. The sensor 53 may further be in communication with the hub controller 58 and/or the pitch controller(s) 30 and may provide related information to the hub controller 58 and/or the pitch controller(s) 30.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
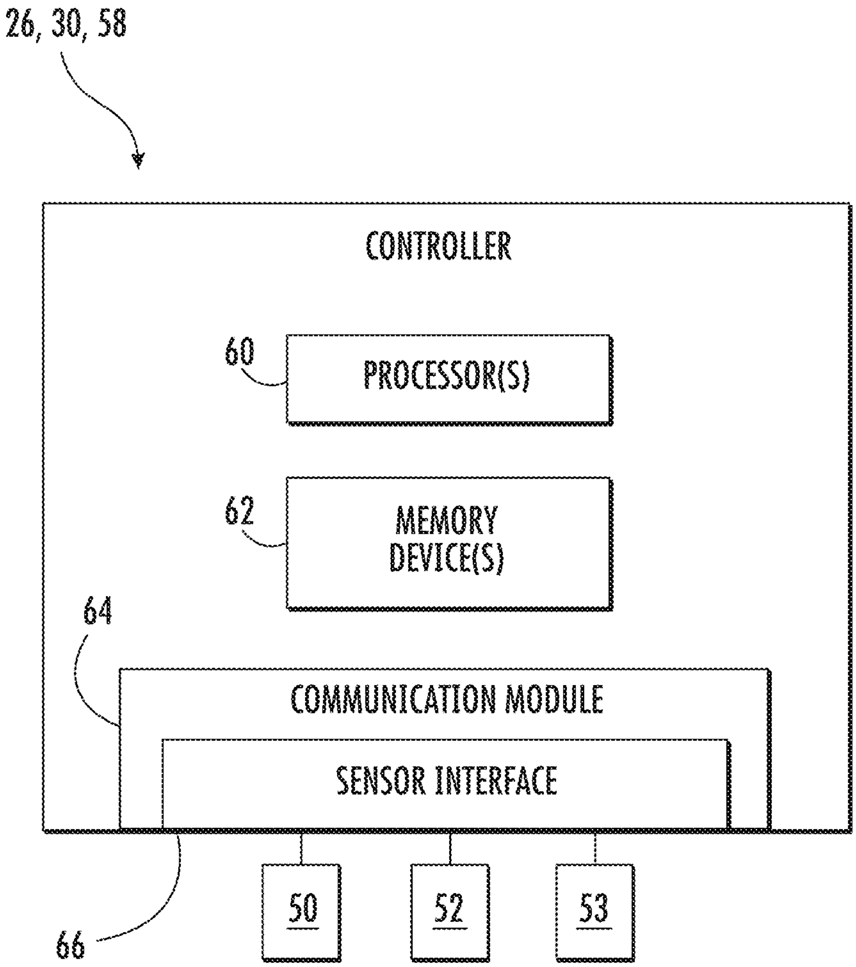
FIG. 3 illustrates a schematic diagram of an embodiment of suitable components that may be included in a wind turbine controller according to the present disclosure.

Referring now to FIG. 3, a block diagram of an embodiment of suitable components that may be included within a controller, such as the turbine controller 26, the pitch controller 30, and/or the hub controller 58, according to the present disclosure is illustrated. As shown, the controller(s) 26, 30, 58 may include one or more processor(s) 60 and associated memory device(s) 62 configured to perform a variety of computer-implemented functions (e.g., performing the methods, steps, calculations and the like and storing relevant data as disclosed herein).

Additionally, the controller(s) 26, 30, 58 may also include a communications module 64 to facilitate communications between the controller(s) 26, 30, 58 and the various components of the wind turbine 10. Further, the communications module 64 may include a sensor interface 66 (e.g., one or more analog-to-digital converters) to permit signals transmitted from one or more sensors 51, 52, 53 to be converted into signals that can be understood and processed by the processors 60. It should be appreciated that the sensors 51, 52, 53 may be communicatively coupled to the communications module 64 using any suitable means. For example, as shown in FIG. 3, the sensors 51, 52, 53 are coupled to the sensor interface 66 via a wired connection. However, in other embodiments, the sensors 51, 52, 53 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 4:
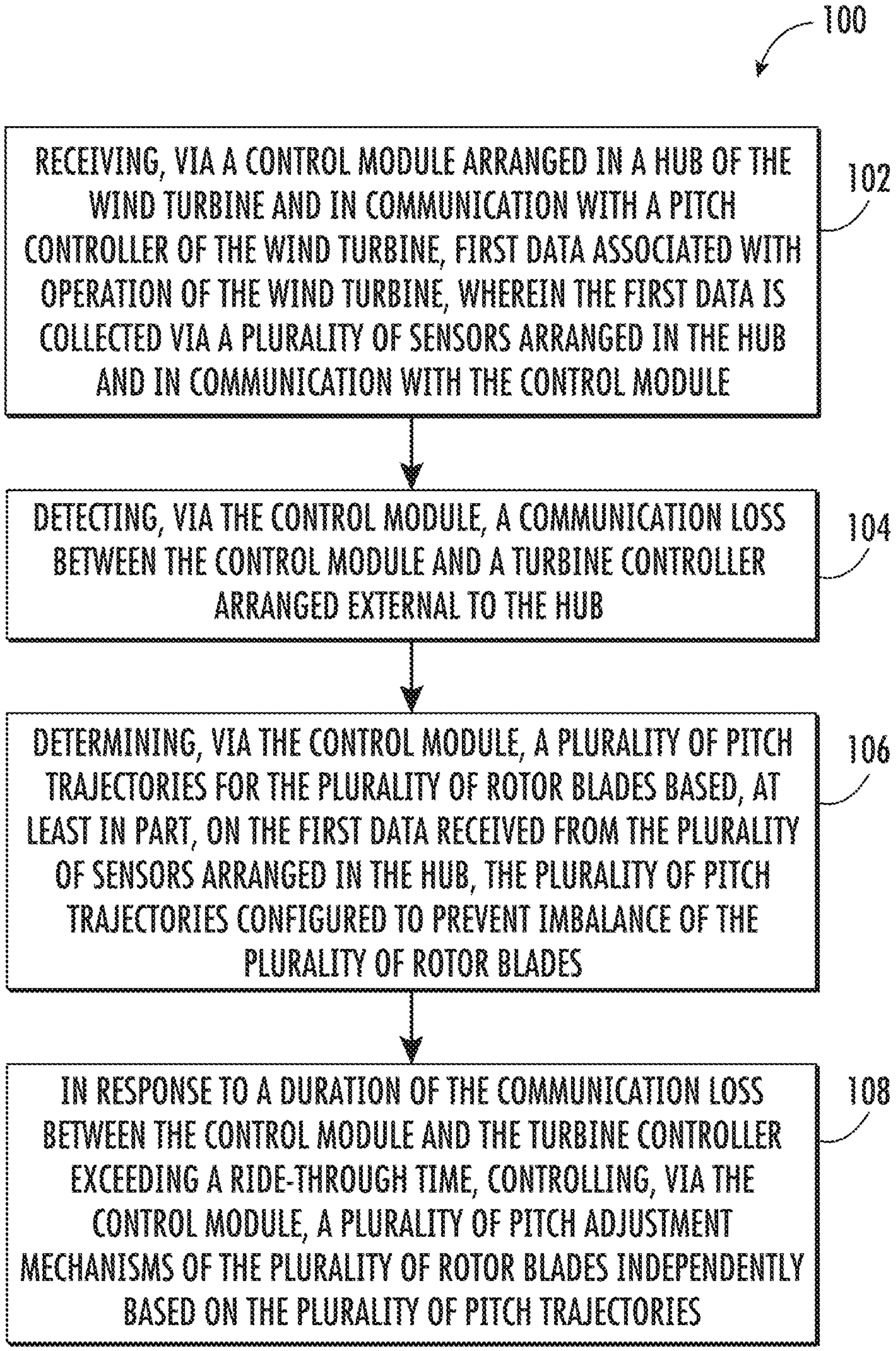
FIG. 4 illustrates a flow diagram of an embodiment of a method for controlling a wind turbine during a communication loss according to the present disclosure.

Referring now to FIG. 4, a flow diagram of an embodiment of a method 100 for controlling a wind turbine is illustrated according to the present disclosure. The method 100 may be implemented using, for instance, the wind turbine 10 and the turbine controller 26, the pitch controller, the hub controller 58, and/or the control module(s) 59 discussed above with reference to FIGS. 1-3. FIG. 4 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously, or modified in numerous ways without deviating from the scope of the present disclosure.

As shown at (102), the method 100 includes receiving, via the control module(s) 59, first data associated with operation of the wind turbine 10. In an embodiment, the first data associated with operation of the wind turbine 10 may be collected by the sensor(s) 53 arranged on or within the hub 16 and/or on or within the rotor blades 22. In an embodiment, the first data includes operational parameters of the wind turbine 10. For example, in an embodiment, the operational parameters may include values for various parameters defining an operating state of the wind turbine 10. By way of example, the first data can include sensed values for various operational parameters, such as rotor speed, rotor pitch, nacelle yaw, actual power output, generator speed, etc. The sensed values for these operational parameters can be utilized to calculate or otherwise determine (e.g., via model-based estimation) values for other operational parameters associated with the wind turbine 10 (e.g., mechanical loads, component stresses and strains, expected power output, etc.). The calculated values can be included in the first data associated with the operation of the wind turbine 10.

In some embodiments, the first data may also include environmental parameters around the wind turbine 10. The environmental parameters include values for various parameters defining an environmental state around the wind turbine 10. By way of example, the first data can include sensed values for various environmental parameters, such as wind speed, wind direction, ambient temperature, etc. The sensed values for these environmental parameters can be utilized to calculate or determine values for other environmental parameters associated with the wind turbine 10 (e.g., wind turbulence, wind effects, etc.). The calculated values can be included in the first data associated with the operation of the wind turbine 10.

Furthermore, in an embodiment, the method 100 may include receiving, via the turbine controller 26, second data associated with operation of the wind turbine 10. The second data associated with operation of the wind turbine 10 may be collected by sensors 51, 52 arranged external to the hub 20 (e.g., in the nacelle 16). The second data may include operational parameters of the wind turbine 10 and/or environment parameters around the wind turbine 10, as described above. By way of example, the second data can include sensed values for various operational and/or environmental parameters. The sensed values for these parameters can be utilized to calculate or determine values for other parameters associated with the wind turbine 10. The calculated values can be included in the second data associated with the operation of the wind turbine 10.

Still referring to FIG. 4, as shown at (104), the method 100 includes detecting, via the control module(s) 59, a communication loss between the control module(s) 59 and the turbine controller 26. For example, the control module(s) 59 can detect the communication loss based on not receiving information from the turbine controller 26 within a time interval having a predetermined duration. That is, the control module(s) 59 can detect the communication loss in response to not receiving timely information from the turbine controller 26. The time interval may be initiated in response to the control module(s) 59 transmitting information to and/or receiving information from the turbine controller 26.

Further, in embodiments, the control module(s) 59 can be configured to determine a pitch angle for each of the rotor blades 22 based, at least in part, on the first data. For example, in an embodiment, the control module(s) 59 may receive, from the turbine controller 26, a pitch angle for each of the rotor blades 22 prior to the communication loss. The pitch angle may be determined based on the second data and the second reference signal. The pitch angle may include a collective pitch angle and a pitch offset angle. The pitch offset angle may be an additional angle to which each of the rotor blades 22 in the wind turbine 10 is adjusted. The pitch offset angle thus adds to or subtracts from the collective pitch angle, and the sum of the collective pitch angle and the pitch offset angle is the angle for a rotor blade 22. The control module(s) 59 can be configured to maintain the collective pitch angle.

In such embodiments, during the communication loss, the control module(s) 59 can be configured to update the pitch offset angles for the respective rotor blades 22 based on the first data. As such, the control module(s) 59 may determine the respective pitch angles for each rotor blade 22 by combining the collective pitch angle with the respective updated pitch offset angles. In such embodiments, the control module(s) 59 can be configured to control the pitch adjustment mechanisms 32 based on the updated pitch offset angles, which may prevent or reduce asymmetric rotor loads during the communication loss. In alternative embodiments, the control module(s) 59 may be configured to maintain the pitch offset angles received by the turbine controller 26 prior to the communication loss. That is, the pitch offset angles may remain static for the ride-through time.

The collective pitch angle may be determined by the turbine controller 26 and may be an angle to which each of the rotor blades 22 in the wind turbine 10 is adjusted. Thus, the collective pitch angle for each rotor blade 22 in the wind turbine 10 may be generally identical. The pitch offset angle may be determined by the turbine controller 26. The pitch offset angle for each rotor blade 22 in the wind turbine 10 may be individualized for that rotor blade 22 and may be different from or generally identical to the pitch offset angle for any other rotor blade 22 in the wind turbine 10. The turbine controller 26 may determine the collective pitch angle and the individual pitch offset angles for the rotor blades 22 based on the second data. The turbine controller 26 may further transmit the collective pitch angle and the individual pitch offset angles for the rotor blades 22 to the control module(s) 59 while in communication with the control module(s) 59.

As shown at (106), the method 100 includes determining, via the control module(s) 59, a pitch trajectory for each rotor blade 22 based, at least in part, on the first data. The pitch trajectory specifies a change in the pitch angle of the rotor blade 22 from the pitch angle to the feathered position. When the duration of the communication loss exceeds the ride-through time, the turbine controller 26 can be configured to shut down the wind turbine 10. As such, the pitch trajectory may be configured to prevent imbalance in the rotor blades 22 during shut down of the wind turbine 10. As one example, the pitch trajectory may include a synchronization pitch offset angle, the feather position, and at least one predetermined period of time or rotational cycle. In order to prevent imbalance between the rotor blades 22 during the shutdown, each rotor blade 22 may be pitched to a synchronized pitch offset angle. A rotational cycle is a full 360 degree rotation of a rotor blade 22.

The synchronized pitch offset angle may be an additional angle to which each of the rotor blades 22 in the wind turbine 10 is adjusted. The synchronized pitch offset angle thus adds to or subtracts from the collective pitch angle, and the sum of the collective pitch angle and the synchronized pitch offset angle is the pitch angle for a rotor blade 22. The synchronized pitch offset angle for each rotor blade 22 in the wind turbine 10 may be generally identical.

The control module(s) 59 may be configured to determine the synchronized pitch offset angle based on the first data. Further, the control module(s) 59 may determine the synchronized pitch offset angle for the rotor blades 22 based on the individual pitch offset angles for each of the rotor blades 22. For example, the synchronized pitch offset angle may be adjusted constantly or intermittently as the various pitch offset angles are adjusted during operation of the wind turbine 10, such that each rotor blade 22 can be pitched towards and/or to the synchronized pitch offset angle within one predetermined period of time or rotational cycle.

Referring still to FIG. 4, as shown at (108), the method 100 includes, in response to a duration of the communication loss between the control module(s) 59 and the turbine controller 26 exceeding a ride-through time, controlling, via the control module(s) 59, the pitch adjustment mechanisms 32 independently based on the respective pitch trajectories. That is, the control module(s) 59 can transmit commands to the pitch adjustment mechanisms 32 to pitch the rotor blades 22 along the pitch trajectories to the feathered position. As an example, a ride-through time described herein may generally refer to a time period during a communication loss for which the control module(s) 59 controls the wind turbine 10, or components thereof. As such, in an embodiment, the ride-through time is initiated when the communication loss occurs. In some embodiments, the wind turbine 10 may be shut down when a duration of the communication loss exceeds the ride-through time.

During the communication loss, the control module(s) 59 may, for example, determine whether the pitch offset angle is different from the synchronized pitch offset angle. In the event that the pitch offset angle is different from the synchronized pitch offset angle, the control module(s) 59 may control the pitch adjustment mechanism 32 so as to cause the rotor blade 22 to pitch to the synchronized pitch offset angle when the duration of the communication loss exceeds the ride-through time. Thus, each rotor blade 22 can be independently and efficiently pitched towards an approximately identical angle when the communication loss exceeds the ride-through time.

Each of the plurality of rotor blades 22 may then be pitched towards the feathered position within another predetermined period of time or rotational cycle. Such pitching may occur after pitching towards the synchronized pitch offset angle. First requiring pitching of each rotor blade towards the synchronized pitch offset angle advantageously reduces or prevents imbalances between the rotor blades 22 during pitching towards the feathered position, because the rotor blades 22 will have approximately identical pitching profiles as they pitch towards the feathered position.

Further, in some embodiments, the method 100 may include, in response to the communication loss, controlling, via the control module(s) 59, the pitch adjustment mechanisms 32 independently for the ride-through time based on the pitch angles for the rotor blades 22. As discussed above, the control module(s) 59 can determine the pitch angles based on the first data. During the ride-through time, the control module(s) 59 can be configured to continuously or intermittently update the pitch angles based on the first data collected during the ride-through time. In such embodiments, the control module(s) 59 can receive the ride-through time from the turbine controller 26 prior to the communication loss.

In some embodiments, the turbine controller 26 may be configured to determine the ride through time based, at least in part, on a comparison of a first reference signal and a second reference signal. The control module(s) 59 can be configured to determine the first reference signal based, at least in part, on the first data. In an embodiment, the first reference signal indicates an operating parameter to achieve the desired operation (e.g., power output while satisfying loading capacities) of the wind turbine 10. The first reference signal may include at least one of a rotor speed, a torque, a pitch angle, and/or any other suitable parameter for desired operation of the wind turbine 10. In some embodiments, the control module(s) 59 can be configured to determine the first reference signal based on the first data and the second data (e.g., received from the turbine controller 26) while in communication with the turbine controller 26. As such, the control module(s) 59 can be further configured to update the first reference signal based on only the first data after the communication loss. Determining the first reference signal based, at least in part, on the first data allows the control module(s) 59 to operate the wind turbine 10 (e.g., by controlling the pitch adjustment mechanisms 32) to achieve desired operation of the wind turbine 10 despite the communication loss with the turbine controller 26.

The control module(s) 59 may be further configured to transmit the first reference signal to the turbine controller 26 while in communication with the turbine controller 26. In embodiments, the turbine controller 26 may be configured to determine the second reference signal based on the second data. The second reference signal corresponds to the first reference signal (i.e., indicates the same operating parameter as the first reference signal).

The turbine controller 26 may be configured to compare the first and second reference signals to determine whether the control module(s) 59 is capable of controlling the wind turbine 10 in a same or similar manner as the turbine controller 26. When a difference between the first and second reference signals exceeds a threshold, the control module(s) 59 may be incapable of controlling the wind turbine 10. In some embodiments, the duration of the ride-through time can be maintained at a minimum duration (e.g., 1-1.5 seconds). The minimum duration may be predetermined so as to provide an opportunity for communication to be restored while minimizing a likelihood of the wind turbine 10 being subjected to excessive loading due to changes in environmental conditions around the wind turbine 10. In additional or alternative embodiments, the control module(s) 59 can control the wind turbine 10 based on the second reference signal (e.g., received from the turbine controller 26 prior to the communication loss) for the ride-through time. In such embodiments, the control module(s) 59 can control the wind turbine 10 for the ride-through time so as to maintain the operational parameters of the wind turbine 10 collected prior to the communication loss.

When the difference between the first and second reference signals is within the threshold, the control module(s) 59 may be capable of controlling the wind turbine 10 such that the duration of the ride-through time can be increased above the minimum duration. Increasing the ride-through time allows the control module(s) 59 to maintain, using the first data, wind turbine 10 operations for extended durations of communication losses between the turbine controller 26 and the control module(s) 59, which can avoid unnecessary shutdowns and thereby improve the efficiency of the wind turbine 10.

As an example, the turbine controller 26 may determine the ride-through time as a function of the comparison (e.g., the ride-through time may be inversely proportional to a difference between the first and second reference signals). In such an example, the turbine controller 26 may access a look-up table, or the like, associating various ride-through times with various differences between the first and second reference signals. As another example, the turbine controller 26 may determine that the ride-through time is a first predetermined duration when the difference between the first and second reference signals is less than the threshold. Further, the turbine controller 26 may determine that the ride-through time is a second predetermined duration when the difference between the first and second reference signals is greater than or equal to the threshold. The second predetermined duration may be greater than the first predetermined duration.

Furthermore, in additional or alternative embodiments, the turbine controller 26 may be configured to determine the ride-through time based, at least in part, on environmental data. The environmental data may be included in the second data associated with operation of the wind turbine 10, as discussed above. For example, the turbine controller 26 may determine that the duration of the ride-through time is decreased for environmental data indicating turbulent wind conditions as compared to environmental data indicating steady wind conditions.

Moreover, in embodiments, the method 100 can include, in response to communication between the control module (s) 59 and the turbine controller 26 being restored during the ride-through time (i.e., the duration of the communication loss is less than the ride-through time), controlling, via the turbine controller 26, the pitch adjustment mechanisms 32 based on the second data. That is, the turbine controller 26 can retake control of the wind turbine 10 from the control module(s) 59 when communication is restored during the ride-through time. In this situation, the turbine controller 26 can determine the second reference signal based on the second data, as discussed above. The turbine controller 26 can then transmit commands to the pitch controller(s) 30 (e.g., via the slip ring 43) to instruct the pitch adjustment mechanisms 32 to pitch the rotor blades 22 to respective pitch angles based on the second reference signal. Additionally, or alternatively, the turbine controller 26 can adjust a generator torque based on the second reference signal.

In addition, in some embodiments, the turbine control 26 may be configured to, during the communication loss, control the generator torque based on the second reference signal when the second reference signal includes the rotor speed. For example, the turbine controller 26 may be configured to increase the generator torque when the rotor speed of the second reference signal is greater than an upper speed threshold so as to reduce the rotor speed to the upper speed threshold. As another example, the turbine controller 26 may be configured to decrease the generator torque when the rotor speed of the second reference signal is less than a lower speed threshold so as to increase the rotor speed to the lower speed threshold. As yet another example, the turbine controller 26 may be configured to maintain the generator torque when the rotor speed second reference signal is between the upper and lower speed thresholds. Adjusting the generator torque to maintain the rotor speed between the upper and lower speed thresholds may reduce or prevent excessive loading on the pitch adjustment mechanisms 32.

In some embodiments, when the second reference signal includes the rotor speed, the turbine controller 26 can be configured to determine an updated reference signal based on the ride-through time. The updated reference signal can include a predetermined rotor speed that is less than the rotor speed of the second reference signal. As discussed above, the turbine controller 26 can be configured to determine the ride-through time based on a comparison between the first and second reference signals. When the ride-through time is greater than a threshold time, the turbine controller 26 can, for example, update the second reference signal to include the predetermined rotor speed. The predetermined rotor speed may, for example, be specified by a manufacturer of the wind turbine 10 and/or component(s) thereof (e.g., based on testing and/or simulation to determine a rotor speed that permits operation of the wind turbine 10 while reducing a likelihood of excessive loading during the communication loss). As another example, the updated reference signal may be determined as a function of a difference between the ride-through time and the threshold time. During the communication loss, the turbine controller 26 may be configured to control the generator torque based on the updated reference signal when the duration of the communication loss exceeds the threshold time so as to reduce the rotor speed based on the updated reference signal. As such, prior to the duration of the communication loss exceeding the threshold time, the turbine controller 26 may be configured to adjust the generator torque based on the second reference signal, as discussed above. Reducing the second reference signal for longer duration communication losses can reduce a likelihood of the rotor blades 22 being subjected to excessive loading resulting from changing environmental conditions around the wind turbine 10.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or conducted in a manner that achieves or optimizes one advantage or group of advantages as taught herein without necessarily achieving other objects or advantages as may be taught or suggested herein.

Various aspects and embodiments of the present disclosure are defined by the following clauses:

A method for controlling a wind turbine having a plurality of rotor blades, the method comprising: receiving, via a control module arranged in a hub of the wind turbine and in communication with a pitch controller of the wind turbine, first data associated with operation of the wind turbine, wherein the first data is collected via a plurality of sensors arranged in the hub and in communication with the control module; detecting, via the control module, a communication loss between the control module and a turbine controller arranged external to the hub; determining, via the control module, a plurality of pitch trajectories for the plurality of rotor blades based, at least in part, on the first data received from the plurality of sensors arranged in the hub, the plurality of pitch trajectories configured to prevent imbalance of the plurality of rotor blades; and, in response to a duration of the communication loss between the control module and the turbine controller exceeding a ride-through time, controlling, via the control module, a plurality of pitch adjustment mechanisms of the plurality of rotor blades independently based on the plurality of pitch trajectories.

The method of any preceding clause, wherein the control module is part of a separate controller apart from the pitch controller.

The method of any preceding clause, wherein the control module is programmed in the pitch controller.

The method of any preceding clause, further comprising, in response to the communication loss between the control module and the turbine controller, controlling, via the control module, the plurality of pitch adjustment mechanisms for the ride-through time based on a plurality of pitch angles for the plurality of rotor blades.

The method of any preceding clause, further comprising determining, via the control module, the plurality of pitch angles based, at least in part, on the first data received from the plurality of sensors arranged in the hub.

The method of any preceding clause, further comprising: receiving, via the control module, a plurality of pitch offset angles from the turbine controller prior to the communication loss; and determining, via the control module, the plurality of pitch angles based on the plurality of pitch offset angles.

The method of any preceding clause, further comprising: receiving, via the turbine controller, second data associated with the operation of the wind turbine, wherein the second data is collected via a plurality of sensors arranged external to the hub and in communication with the turbine controller; and determining, via the turbine controller, the plurality of pitch offset angles based on the second data.

The method of any preceding clause, further comprising: determining, via the control module, a first reference signal based on the first data; providing, via the control module, the first reference signal to the turbine controller prior to the communication loss; and receiving, via the control module, the ride-through time from the turbine controller prior to the communication loss.

The method of any preceding clause, wherein the first reference signal comprises at least one of a rotor speed, a torque, or a pitch angle.

The method of any preceding clause, further comprising: receiving, via the turbine controller, the first reference signal from the control module prior to the communication loss; receiving, via the turbine controller, second data associated with the operation of the wind turbine, wherein the second data is collected via a plurality of sensors arranged external to the hub and in communication with the turbine controller; determining, via the turbine controller, a second reference signal based on the second data; and determining, via the turbine controller, the ride-through time based, at least in part, on the first reference signal and the second reference signal.

The method of any preceding clause, wherein determining, via the turbine controller, the ride-through time based, at least in part, on the first reference signal and the second reference signal further comprises: receiving, via the turbine controller, environmental data comprising environmental parameters around the wind turbine, wherein the environmental data is collected via the plurality of sensors arranged external to the hub; and determining, via the turbine controller, the ride-through time based, at least in part, on the environmental data.

The method of any preceding clause, further comprising, in response to communication between the control module and the turbine controller being restored during the ride through time, controlling, via the turbine controller, the plurality of pitch adjustment mechanisms based on the second reference signal.

The method of any preceding clause, wherein the control module is configured to generate a command for controlling the plurality of pitch adjustment mechanisms relative to a rotating reference frame, and the turbine controller is configured to generate a command for controlling the plurality of pitch adjustment mechanisms relative to a fixed reference frame.

The method of any preceding clause, further comprising: receiving, via the turbine controller, second data associated with the operation of the wind turbine, wherein the second data is collected via a plurality of sensors arranged external to the hub and in communication with the turbine controller; determining, via the turbine controller, a second reference signal based on the second data, the second reference signal including a rotor speed; and, in response to the communication loss between the control module and the turbine controller, adjusting, via the turbine controller, a generator torque when the second reference signal is greater than a speed threshold.

The method of any preceding clause, further comprising: determining, via the turbine controller, the ride-through time based, at least in part, on the second data; determining, via the turbine controller, an updated reference signal based on the ride-through time being greater than a threshold time, wherein the updated reference signal includes a predetermined rotor speed that is less than the rotor speed of the second reference signal; and, in response to the duration of the communication loss exceeding the threshold time, controlling, via the turbine controller, the generator torque based on the updated reference signal.

The method of any preceding clause, wherein the ride-through time is a variable time dependent, at least in part, on the first data.

A system for controlling a wind turbine, the system comprising: a hub; a plurality of rotor blades coupled to the hub and including a plurality of pitch adjustment mechanisms; a control module arranged in the hub and in communication with a pitch controller of the wind turbine, the control module including at least one processor configured to perform a plurality of operations comprising: receiving first data associated with operation of the wind turbine, wherein the first data is collected via a plurality of sensors arranged in the hub and in communication with the control module; detecting a communication loss between the control module and a turbine controller arranged external to the hub; determining a plurality of pitch trajectories for the plurality of rotor blades based, at least in part, on the first data received from the plurality of sensors arranged in the hub, the plurality of pitch trajectories configured to prevent imbalance of the plurality of rotor blades; and, in response to a duration of the communication loss between the control module and the turbine controller exceeding a ride-through time, controlling, via the control module, a plurality of pitch adjustment mechanisms of the plurality of rotor blades independently based on the plurality of pitch trajectories.

The system of any preceding clause, wherein the control module is part of a separate controller apart from the pitch controller.

The system of any preceding clause, wherein the control module is programmed in the pitch controller.

The system of any preceding clause, wherein the plurality of operations further comprises, in response to the communication loss between the control module and the turbine controller, controlling the plurality of pitch adjustment mechanisms for the ride-through time based on a plurality of pitch angles for the plurality of rotor blades.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine having a plurality of rotor blades, the method comprising:

receiving, via a control module arranged in a hub of the wind turbine and in communication with a pitch controller of the wind turbine, first data associated with operation of the wind turbine, wherein the first data is collected via a plurality of sensors arranged in the hub and in communication with the control module;

detecting, via the control module, a communication loss between the control module and a turbine controller arranged external to the hub;

determining, via the control module, a plurality of pitch trajectories for the plurality of rotor blades based, at least in part, on the first data received from the plurality of sensors arranged in the hub, the plurality of pitch trajectories configured to prevent imbalance of the plurality of rotor blades; and in response to a duration of the communication loss between the control module and the turbine controller exceeding a ride-through time, controlling, via the control module, a plurality of pitch adjustment mechanisms of the plurality of rotor blades independently based on the plurality of pitch trajectories, wherein the ride-through time is a variable time dependent, at least in part, on the first data.

2. The method of claim 1, wherein the control module is part of a separate controller apart from the pitch controller.

3. The method of claim 1, wherein the control module is programmed in the pitch controller.

4. The method of claim 1, further comprising, in response to the communication loss between the control module and the turbine controller, controlling, via the control module, the plurality of pitch adjustment mechanisms for the ride-through time based on a plurality of pitch angles for the plurality of rotor blades.

5. The method of claim 4, further comprising determining, via the control module, the plurality of pitch angles based, at least in part, on the first data received from the plurality of sensors arranged in the hub.

6. The method of claim 4, further comprising:

receiving, via the control module, a plurality of pitch offset angles from the turbine controller prior to the communication loss; and determining, via the control module, the plurality of pitch angles based on the plurality of pitch offset angles.

7. The method of claim 6, further comprising:

receiving, via the turbine controller, second data associated with the operation of the wind turbine, wherein the second data is collected via a plurality of sensors arranged external to the hub and in communication with the turbine controller; and determining, via the turbine controller, the plurality of pitch offset angles based on the second data.

8. The method of claim 1, further comprising:

determining, via the control module, a first reference signal based on the first data;

providing, via the control module, the first reference signal to the turbine controller prior to the communication loss; and receiving, via the control module, the ride-through time from the turbine controller prior to the communication loss.

9. The method of claim 8, wherein the first reference signal comprises at least one of a rotor speed, a torque, or a pitch angle.

10. The method of claim 8, further comprising:

receiving, via the turbine controller, the first reference signal from the control module prior to the communication loss;

receiving, via the turbine controller, second data associated with the operation of the wind turbine, wherein the second data is collected via a plurality of sensors arranged external to the hub and in communication with the turbine controller;

determining, via the turbine controller, a second reference signal based on the second data; and determining, via the turbine controller, the ride-through time based, at least in part, on the first reference signal and the second reference signal.

11. The method of claim 10, further comprising, in response to communication between the control module and the turbine controller being restored during the ride through time, controlling, via the turbine controller, the plurality of pitch adjustment mechanisms based on the second reference signal.

12. The method of claim 11, wherein the control module is configured to generate a command for controlling the plurality of pitch adjustment mechanisms relative to a rotating reference frame, and the turbine controller is configured to generate a command for controlling the plurality of pitch adjustment mechanisms relative to a fixed reference frame.

13. The method of claim 1, further comprising:

receiving, via the turbine controller, environmental data comprising environmental parameters around the wind turbine, wherein the environmental data is collected via a plurality of sensors arranged external to the hub; and determining, via the turbine controller, the ride-through time based, at least in part, on the environmental data.

14. The method of claim 1, further comprising:

receiving, via the turbine controller, second data associated with the operation of the wind turbine, wherein the second data is collected via a plurality of sensors arranged external to the hub and in communication with the turbine controller;

determining, via the turbine controller, a second reference signal based on the second data, the second reference signal including a rotor speed; and in response to the communication loss between the control module and the turbine controller, adjusting, via the turbine controller, a generator torque when the second reference signal is greater than a speed threshold.

15. The method of claim 14, further comprising:

determining, via the turbine controller, the ride-through time based, at least in part, on the second data;

determining, via the turbine controller, an updated reference signal based on the ride-through time being greater than a threshold time, wherein the updated reference signal includes a predetermined rotor speed that is less than the rotor speed of the second reference signal; and in response to the duration of the communication loss exceeding the threshold time, controlling, via the turbine controller, the generator torque based on the updated reference signal.

16. A system for controlling a wind turbine, the system comprising:

a hub;

a plurality of rotor blades coupled to the hub and including a plurality of pitch adjustment mechanisms;

a control module arranged in the hub and in communication with a pitch controller of the wind turbine, the control module including at least one processor configured to perform a plurality of operations comprising:

receiving first data associated with operation of the wind turbine, wherein the first data is collected via a plurality of sensors arranged in the hub and in communication with the control module;

detecting a communication loss between the control module and a turbine controller arranged external to the hub;

determining a plurality of pitch trajectories for the plurality of rotor blades based, at least in part, on the first data received from the plurality of sensors arranged in the hub, the plurality of pitch trajectories configured to prevent imbalance of the plurality of rotor blades; and in response to a duration of the communication loss between the control module and the turbine controller exceeding a ride-through time, controlling, via the control module, a plurality of pitch adjustment mechanisms of the plurality of rotor blades independently based on the plurality of pitch trajectories, wherein the ride-through time is a variable time dependent, at least in part, on the first data.

17. The system of claim 16, wherein the control module is part of a separate controller apart from the pitch controller.

18. The system of claim 16, wherein the control module is programmed in the pitch controller.

19. The system of claim 16, wherein the plurality of operations further comprises, in response to the communication loss between the control module and the turbine controller, controlling the plurality of pitch adjustment mechanisms for the ride-through time based on a plurality of pitch angles for the plurality of rotor blades.

20. A method for controlling a wind turbine having a plurality of rotor blades, the method comprising:

receiving, via a control module arranged in a hub of the wind turbine and in communication with a pitch controller of the wind turbine, first data associated with operation of the wind turbine, wherein the first data is collected via a plurality of sensors arranged in the hub and in communication with the control module;

receiving, via a turbine controller arranged external to the hub, environmental data comprising environmental parameters around the wind turbine, wherein the environmental data is collected via a plurality of sensors arranged external to the hub;

determining, via the turbine controller, the ride-through time based, at least in part, on the environmental data;

detecting, via the control module, a communication loss between the control module and the turbine controller;

determining, via the control module, a plurality of pitch trajectories for the plurality of rotor blades based, at least in part, on the first data received from the plurality of sensors arranged in the hub, the plurality of pitch trajectories configured to prevent imbalance of the plurality of rotor blades; and in response to a duration of the communication loss between the control module and the turbine controller exceeding a ride-through time, controlling, via the control module, a plurality of pitch adjustment mechanisms of the plurality of rotor blades independently based on the plurality of pitch trajectories.

* * * * *